United States Patent
Hawkins et al.

(10) Patent No.: US 8,256,446 B2
(45) Date of Patent: Sep. 4, 2012

(54) MODULAR REGULATOR PLATFORM

(75) Inventors: James Chester Hawkins, Allen, TX (US); Paul Richard Anderson, Zimmerman, MN (US); Gregory Lawrence Foust, Plano, TX (US); Seth Kranz, Royse City, TX (US); Jason Scott Mevius, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 1142 days.

(21) Appl. No.: 12/101,754

(22) Filed: Apr. 11, 2008

(65) Prior Publication Data
US 2008/0258098 A1 Oct. 23, 2008

Related U.S. Application Data

(60) Provisional application No. 60/913,463, filed on Apr. 23, 2007.

(51) Int. Cl.
*G05D 16/06* (2006.01)
*F16K 31/365* (2006.01)
*F16K 31/165* (2006.01)
*F16K 17/34* (2006.01)

(52) U.S. Cl. .......... 137/116.5; 137/505.46; 137/505.47; 137/484.8; 137/269; 137/270

(58) Field of Classification Search .......... 137/271, 137/116.5, 505.46, 505.47, 484.8, 269, 270, 137/505.11, 505.22, 505.29, 505.36, 505.37
See application file for complete search history.

(56) References Cited

U.S. PATENT DOCUMENTS

| | | | | |
|---|---|---|---|---|
| 309,260 A * | 12/1884 | Taylor | ............................ | 137/269 |
| 1,096,885 A * | 5/1914 | Bacon | ............................ | 137/596 |
| 1,918,602 A * | 7/1933 | Joyce | ............................ | 137/484.4 |
| 2,619,983 A * | 12/1952 | Roberts | ............................ | 137/484.8 |
| 2,648,322 A | 8/1953 | Carter | | |
| 2,827,069 A * | 3/1958 | Peterson | ............................ | 137/116.5 |
| 2,890,713 A * | 6/1959 | Semon | ............................ | 137/484.8 |
| 2,979,895 A | 4/1961 | Haase et al. | | |
| 3,012,573 A * | 12/1961 | Peterson | ............................ | 137/505 |
| 3,032,054 A * | 5/1962 | Irwin | ............................ | 137/116.5 |
| 3,242,938 A * | 3/1966 | Smilg et al. | ............................ | 137/505.42 |
| 3,384,110 A * | 5/1968 | Wiley | ............................ | 137/458 |

(Continued)

FOREIGN PATENT DOCUMENTS

GB 1447255 8/1976

OTHER PUBLICATIONS

International Searching Authority, "International Search Report," issued in connection with international application serial No. PCT/US2008/060495, mailed Mar. 30, 2010, 4 pages.

(Continued)

*Primary Examiner* — Craig Schneider
*Assistant Examiner* — Jonathan Waddy
(74) *Attorney, Agent, or Firm* — Hanley, Flight & Zimmerman, LLC

(57) ABSTRACT

Apparatus to configure fluid regulators are described. In one example, a stem guide for use with a fluid regulator is described. The stem guide includes a body having an opening to slidably receive a valve stem and an outer surface having a plurality of circumferential seals that removably couple the body within a bore of a regulator casing and align the body with the regulator casing or a valve.

19 Claims, 18 Drawing Sheets

U.S. PATENT DOCUMENTS

| | | | |
|---|---|---|---|
| 3,561,468 A * | 2/1971 | Sugden, Jr. | 137/269 |
| 3,712,332 A * | 1/1973 | Galbraith et al. | 137/495 |
| 3,758,069 A * | 9/1973 | Whitten | 251/58 |
| 3,762,685 A | 10/1973 | Curran | |
| 3,982,559 A | 9/1976 | Ochs | |
| 4,122,726 A | 10/1978 | Tolnai | |
| 4,285,495 A | 8/1981 | King | |
| 4,714,091 A | 12/1987 | Wagner | |
| 4,754,778 A * | 7/1988 | Duffy et al. | 137/484.8 |
| 4,967,785 A | 11/1990 | Young | |
| 4,979,530 A | 12/1990 | Breda | |
| 5,174,331 A | 12/1992 | Steudler, Jr. | |
| 5,186,393 A | 2/1993 | Yie | |
| 5,271,600 A * | 12/1993 | Saadi et al. | 251/40 |
| 5,392,807 A | 2/1995 | Caudle et al. | |
| 5,402,820 A * | 4/1995 | Duffy et al. | 137/505.36 |
| 5,449,142 A * | 9/1995 | Banick | 251/30.04 |
| 5,697,398 A * | 12/1997 | Gidney et al. | 137/484.8 |
| 5,701,927 A * | 12/1997 | Hansen et al. | 137/271 |
| 5,765,588 A | 6/1998 | Katz | |
| 6,167,905 B1 | 1/2001 | Malloy et al. | |
| 6,311,712 B1 * | 11/2001 | Meyer | 137/8 |
| 6,439,257 B1 | 8/2002 | Bruck et al. | |
| 6,505,640 B1 | 1/2003 | Lin | |
| 6,668,853 B2 | 12/2003 | Dean | |
| 6,768,105 B2 | 7/2004 | Mullins et al. | |
| 6,848,466 B2 | 2/2005 | Durand | |
| 6,866,244 B2 | 3/2005 | Wears | |
| 6,877,714 B2 | 4/2005 | Hall | |
| 6,948,519 B2 * | 9/2005 | Cavagna | 137/505.12 |
| 7,175,157 B2 | 2/2007 | Tanikawa et al. | |
| 7,219,689 B2 * | 5/2007 | Pollock et al. | 137/505.46 |
| 2003/0005962 A1 | 1/2003 | Lin | |
| 2004/0007270 A1 | 1/2004 | Olds | |
| 2005/0011554 A1 | 1/2005 | Davila et al. | |
| 2005/0166969 A1 | 8/2005 | Olds | |
| 2006/0065307 A1 | 3/2006 | Schmidt et al. | |
| 2007/0044845 A1 * | 3/2007 | Childers | 137/505.47 |

OTHER PUBLICATIONS

International Searching Authority, "Written Opinion of the International Searching Authority," issued in connection with international application serial No. PCT/US2008/060495, mailed Mar. 30, 2010, 5 pages.

* cited by examiner

MODULAR REGULATOR PLATFORM

This application claims the benefit of U.S. Provisional Patent Application Ser. No. 60/913,463, filed on Apr. 23, 2007, which is hereby incorporated herein by reference in its entirety.

FIELD OF THE DISCLOSURE

The present disclosure relates generally to fluid regulators and, more particularly, to a modular regulator platform that facilitates regulator configuration for global applications.

BACKGROUND

Process control systems utilize a variety of field devices to control process parameters. Fluid regulators are commonly distributed throughout process control systems to control the pressures of various fluids (e.g., liquids, gasses, etc.). Fluid regulators are typically used to regulate the pressure of a fluid to a substantially constant value. Specifically, a fluid regulator has an inlet that typically receives a supply fluid at a relatively high pressure and provides a relatively lower and substantially constant pressure at an outlet. For example, a gas regulator associated with a piece of equipment (e.g., a boiler) may receive a gas having a relatively high pressure from a gas distribution source and may regulate the gas to have a lower, substantially constant pressure suitable for safe, efficient use by the equipment.

Fluid regulators typically control the flow and pressure of fluid using a diaphragm having a set or control pressure force applied to one of its sides via a bias spring. The diaphragm is also operatively coupled directly or via a linkage (e.g., a lever) to a valve disk that is moved relative to an orifice of a seat ring that fluidly couples the inlet of the regulator to its outlet. The diaphragm moves the disk in response to a difference between the outlet pressure and the set or control pressure to vary the flow restriction provided by the disk to achieve a substantially constant outlet pressure, which provides a balancing force to the other side of the diaphragm that is equal or proportional to the set or control pressure.

Different markets around the world often require different combinations of fluid regulator operational and/or performance characteristics. In particular, a desired or required combination of performance or operational characteristics such as, for example, the type of trim, regulator diaphragm assembly action (e.g., direct acting, pressure loaded, pilot operated, etc.), overpressure protection, pressure registration (e.g., internal, external, dual internal/external, etc.) can vary widely across the global marketplace. However, many of the desirable or required combinations of performance or operational characteristics are exclusive of one another and, as a result, many fluid regulator manufacturers provide a number of differently designed regulator product families, each or which is specifically configured to suit the particular needs of a different global market. Such an approach to satisfying global market needs results in manufacturers having to produce and support a large number of diverse products, which is logistically difficult and costly.

SUMMARY

In one described example, a stem guide for use with a fluid regulator includes a body having an opening to slidably receive a valve stem and an outer surface having a plurality of circumferential seals that removably couple the body within a bore of a regulator casing and align the body with the regulator casing or a valve.

In another described example, a fluid regulator includes a first diaphragm assembly disposed within an actuator casing and a valve body coupled to the actuator casing. A stem guide is removably coupled within the actuator casing and has a first passage to guide a valve stem operatively coupled to the first diaphragm assembly. A plurality of seals between an outer surface of the stem guide and an inner surface of the actuator casing align the stem guide with at least one of the actuator casing or the valve body.

In yet another described example, a fluid regulator includes an actuator casing and a valve body coupled to the actuator casing. A first diaphragm assembly selected from a plurality of diaphragm assemblies is operatively coupled within the actuator casing. The first diaphragm assembly is interchangeable with a second diaphragm assembly selected from the plurality of diaphragm assemblies. The fluid regulator also includes a first stem guide removably coupled within the actuator casing. The first stem guide includes a bore to slidably receive a valve stem operatively coupled to the first diaphragm assembly. The first stem guide is selected from a plurality of stem guides and is interchangeable with a second stem guide selected from the plurality of stem guides. A plurality of seals between an outer surface of the first stem guide and an inner surface of the actuator casing align the first stem guide with at least one of the actuator casing or the valve body.

DETAILED DESCRIPTION

Figure 1:
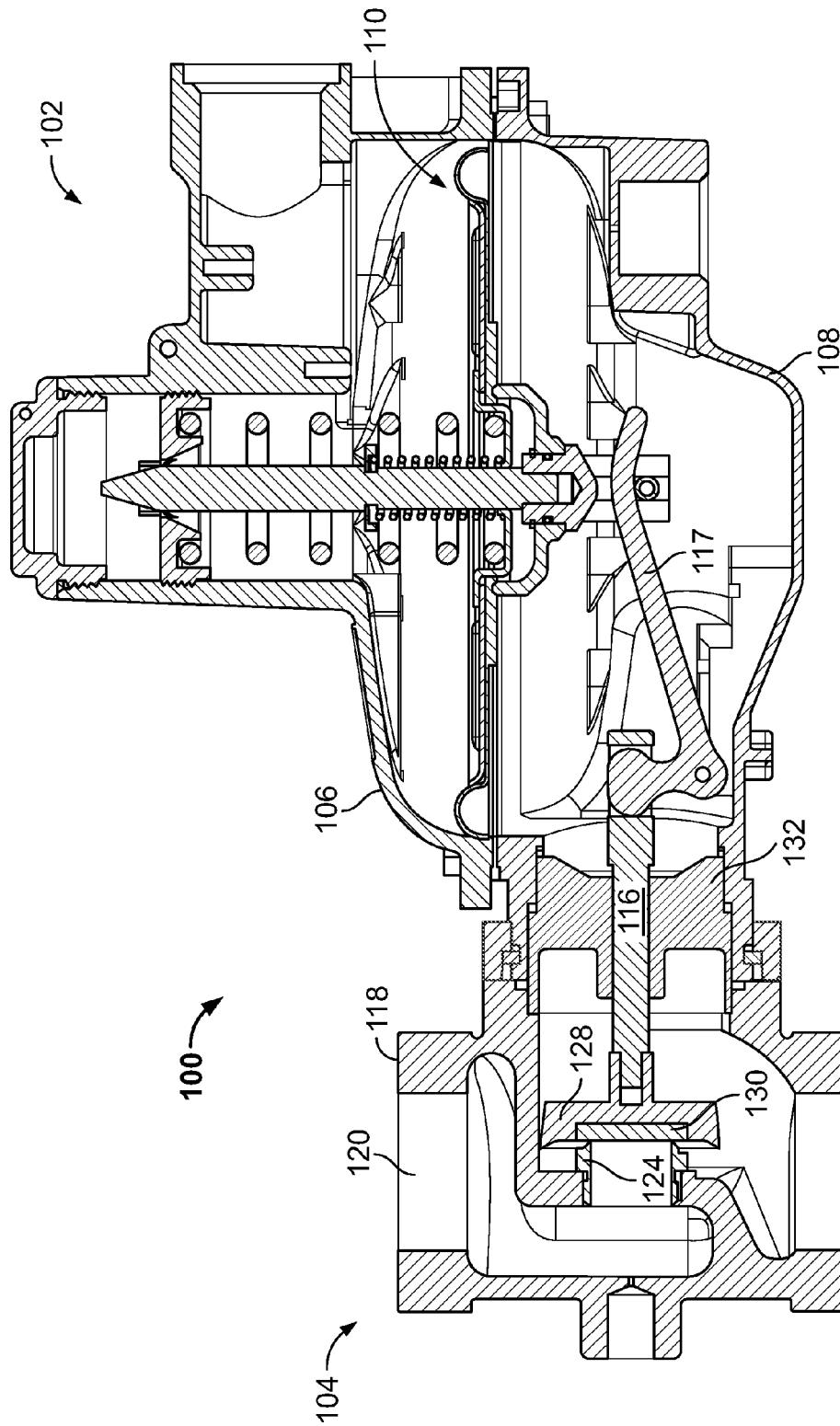
FIG. 1 illustrates an example modular fluid regulator described herein.

The example apparatus described herein enable a fluid regulator manufacturer to provide a single fluid regulator architecture or platform to satisfy the operational and performance characteristic requirements of numerous global markets. More specifically, the example apparatus described herein significantly increase the modularity of regulator components and, thus, enable manufacturers and customers to reduce the number of components needed to provide fluid regulator assemblies configured to meet the diverse needs of numerous global markets. The increased modularity provided by the example fluid regulator apparatus described herein results in fewer overall regulator components which, in turn, reduces costs associated with assembly, maintenance, inventory, component suppliers, training, etc. Further, such increased modularity (e.g., the ability to provide virtually any combination of regulator components due to their interchangeability) also enables a manufacturer to supply fluid regulators to a greater number of global markets at a lower overall cost.

As described in greater detail below, the example fluid regulators described herein may use an interchangeable stem guide and/or an interchangeable diaphragm assembly that enable a variety of different fluid regulator configurations to be implemented within a common actuator casing and/or valve body. More specifically, the example interchangeable stem guides described herein may enable different trim styles such as pressure balanced and non-pressure balanced to be implemented within a common actuator casing and/or valve body. Similarly, the example interchangeable stem guides described herein may enable different valve actions such as direct acting, pressure loaded direct acting, and/or pilot operated valves to be implemented using a common actuator casing and/or valve body.

Many known fluid regulators use a stem guide that is integral with a lower actuator casing to provide acceptable alignment of the stem and disk relative to the seat or orifice of the valve. However, such integration significantly reduces the application flexibility of the actuator casings, valve bodies, etc. For example, different lower actuator casings may be needed to satisfy several different applications because each application may require features or configurations that require a somewhat different stem guide design. However, if the stem guide can be changed (e.g., is interchangeable with multiple stem guides), the actuator casing(s) can be made substantially more universal (e.g., can be used in many different applications and functional configurations).

In contrast to many known fluid regulators, the interchangeable stem guides described herein may be separate from and may be removably coupled to the actuator casing via a plurality of circumferential seals (e.g., o-rings) positioned between an outer surface of the stem guides and an inner wall or surface of the actuator casing. As described in more detail below, the seals provide forces to float or align (e.g., center) the stem guide within the actuator casing and, thus, align the stem guide and a valve stem passing through the guide with the actuator casing and/or a valve attached thereto. Additionally, the seals provide a pressure seal between the actuator casing and the stem guide, provide frictional force to facilitate the retention of the stem guide in the actuator casing during assembly and/or disassembly, and apply a pre-load to the stem guide to reduce or substantially eliminate lateral (e.g., axial) play between the stem guide and the actuator casing.

An example stem guide described herein may alternatively or additionally provide a bore or passage that can be selectively blocked or opened to configure a regulator assembly for external or internal pressure registration, respectively. To facilitate factory and/or field configuration of the regulator assembly for external or internal registration, the stem guide provides an insert member (e.g., a screw) that is to be optionally coupled to the passage to block the passage to configure the regulator for external registration. The insert member may be stored and removed from an opening or aperture (e.g., a blind hole) in the body of the stem guide. As a result, the regulator can be readily configured (e.g., in the field and/or factory) for internal or external pressure registration as needed to suit the requirements of a particular application.

The example fluid regulators described herein also incorporate highly modular diaphragm assemblies that may be configured to satisfy a wide range of different applications and/or operational requirements. More specifically, a first diaphragm assembly selected from a plurality of diaphragm assemblies is interchangeable with a second diaphragm assembly selected from the plurality of diaphragm assemblies to enable a regulator to have a first operational characteristic different from a second operational characteristic provided by the second diaphragm assembly.

As described in greater detail below, the modular diaphragm assemblies described herein include a plurality of interchangeable relief valve seats, relief valve stems, pusher post assemblies, and valve levers. In particular, different combinations of seats and pusher posts can be made to provide different over pressure protection (OPP) functionality such as, for example, internal relief, token relief to support external OPP, non-relief for gas sensitive environments (e.g., indoor regulators near an ignition source, etc.). Additionally or alternatively, the combinations of relief valve stems, pusher post assemblies, and valve lever arms may enable reversal of the diaphragm operation for use in pressure loaded or pilot-based applications and may enable the pusher post assemblies to interface with different lever ratio lever arms. Such different lever ratio lever arms may be used, for example, to enable a fluid regulator to be configured for use with non-pressure balanced trim, which typically requires a greater lever ratio, or pressure balanced trim, which typically requires a relatively lower lever ratio.

Still further the example regulators described herein may be configured to provide balanced (i.e., pressure balanced) or non-balanced trim within a given valve body and/or port size. As a result, a particular valve port size can accommodate a wider range of inlet pressures, thereby significantly reducing the total number of components needed to provide regulators to meet the diverse requirements of multiple global markets.

Additionally, the example regulators described herein can be configured to provide different types of OPP such as, for example, internal pressure relief (such as that noted above), an integral monitor coupled to a primary regulator, or an external safety shutoff device.

Before discussing the details of the example interchangeable stem guides, relief valve seats, relief valve stems, pusher post assemblies, valve levers, etc. that may be used to implement the example modular regulators described herein, a description of an example fluid regulator 100 is provided below in connection with FIG. 1. As depicted in FIG. 1, the example fluid regulator 100 includes an actuator 102 that is operatively coupled to a valve 104. The actuator 102 includes an upper actuator casing 106 and a lower actuator casing 108. The actuator casings 106 and 108 contain a modular (i.e., interchangeable) diaphragm assembly 110 that is operatively coupled to a valve stem 116 via a lever 117. The diaphragm assembly 110 may be interchangeable with other diaphragm assemblies such as, for example, the diaphragm assembly 800 described in connection with FIGS. 8 and 9.

The lower actuator casing 108 is attached to a valve body 118 having an inlet 120 and an outlet 122. A seat 124 is mounted in the valve body 118 and defines an orifice through which fluid may flow from the inlet 120 to the outlet 122. A valve plug 128 attached to an end of the stem 116 includes a sealing disk 130, which may be made of an elastomeric material, that sealingly engages a sealing surface of the seat 124 when the stem 116 and plug 128 are driven toward the seat 124. As described in more detail in connection with FIGS. 2 and 3 below, the example fluid regulator 100 includes an interchangeable stem guide 132. The stem guide 132 includes circumferential seals to align the stem guide 132 and, thus, the stem 116 and sealing disk 130, with at least one of the lower actuator casing 108, the valve body 118, or the seat 124.

The interchangeable stem guide 132 is removably coupled (e.g., via the circumferential seals) within the actuator casing 108 and may be interchangeable with a second stem guide selected from a plurality of stem guides such as, for example, the stem guide 400 depicted in connection with FIGS. 4A, 4B, 4C and 5. In this manner, a first stem guide may be selected from the plurality of stem guides to provide a first operational characteristic different from a second operational characteristic provided by a second stem guide selected from the plurality of stem guides. In one example, a first stem guide is configured to couple to a pressure balanced trim style and a second stem guide is configured to couple to a non-pressure balanced trim style.

Figure 2:
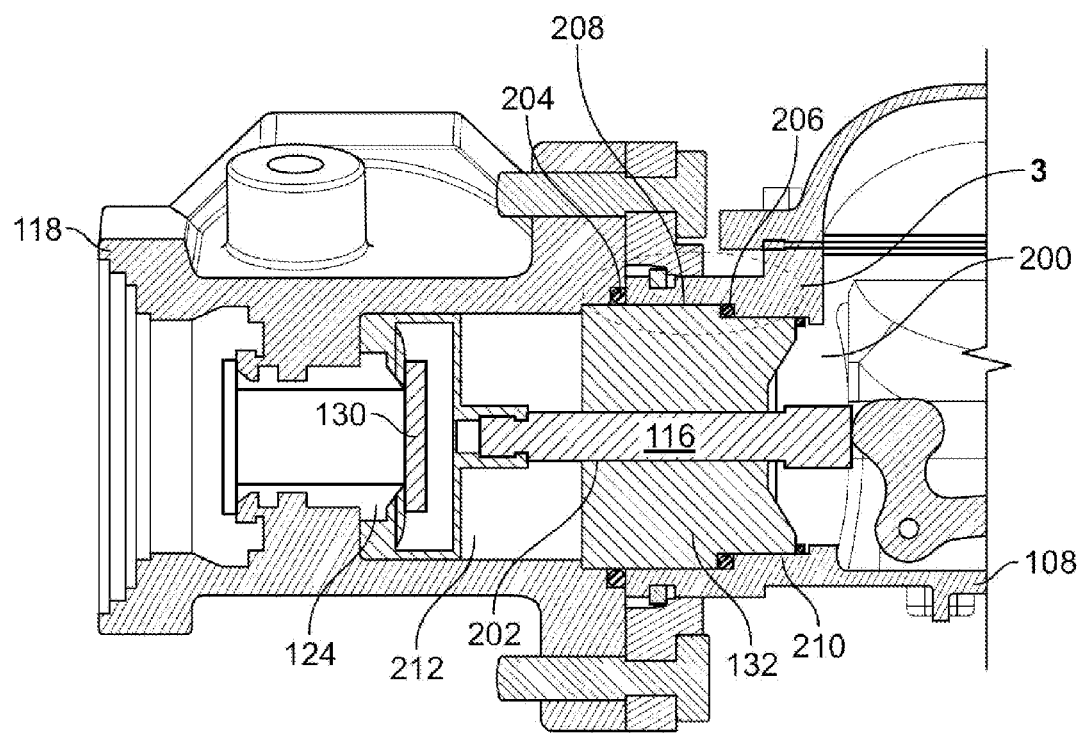
FIG. 2 is a partial cross-sectional view of the example fluid regulator of FIG. 1 depicting an example interchangeable stem guide described herein.
Figure 3:
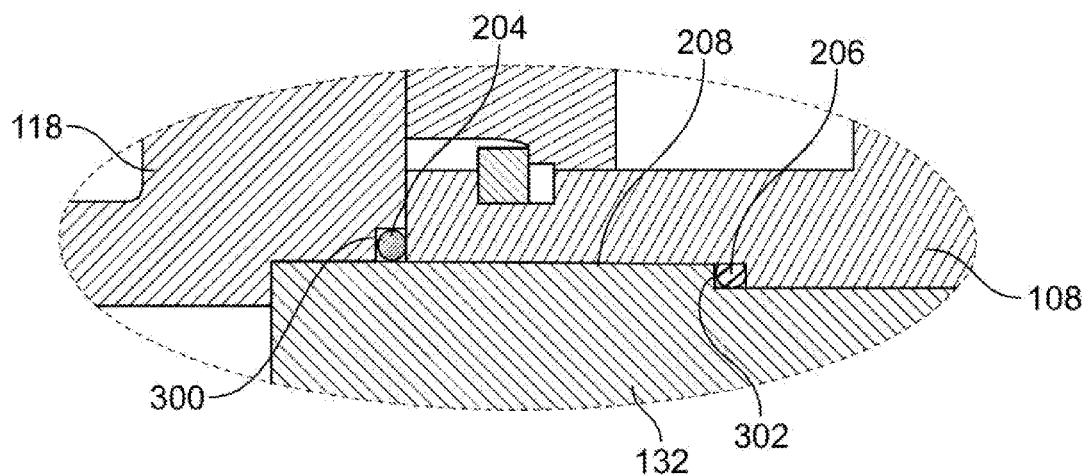
FIG. 3 illustrates an enlarged portion of the example fluid regulator and the example stem guide shown in FIG. 1.
Figure 4A:
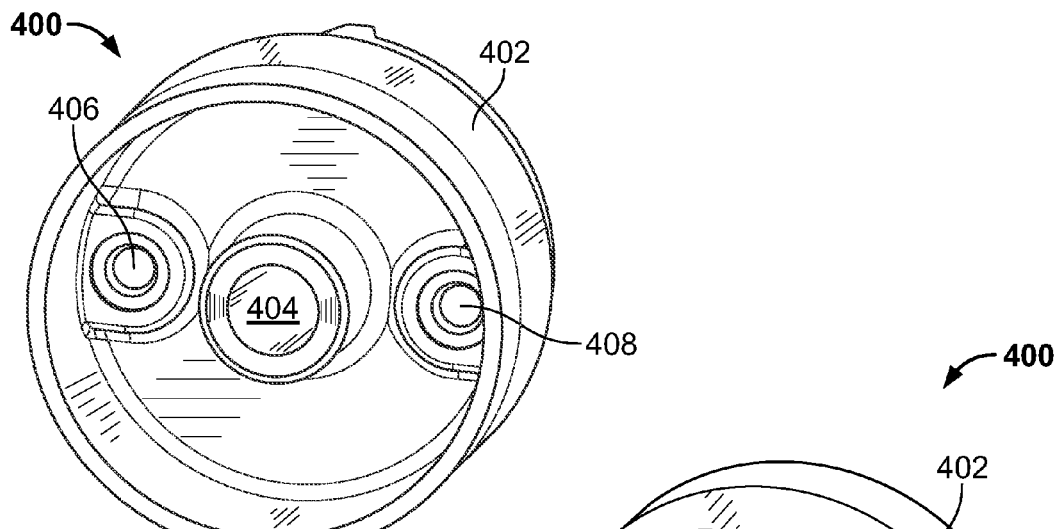
FIGS. 4A, 4B, and 4C illustrate another example stem guide described herein having a selectively blockable passage to configure a fluid regulator for internal or external pressure registration.
Figure 4B:
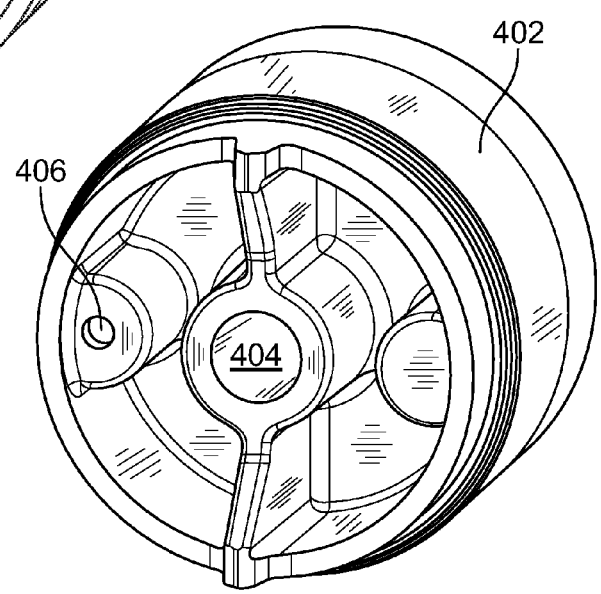
Figure 4C:
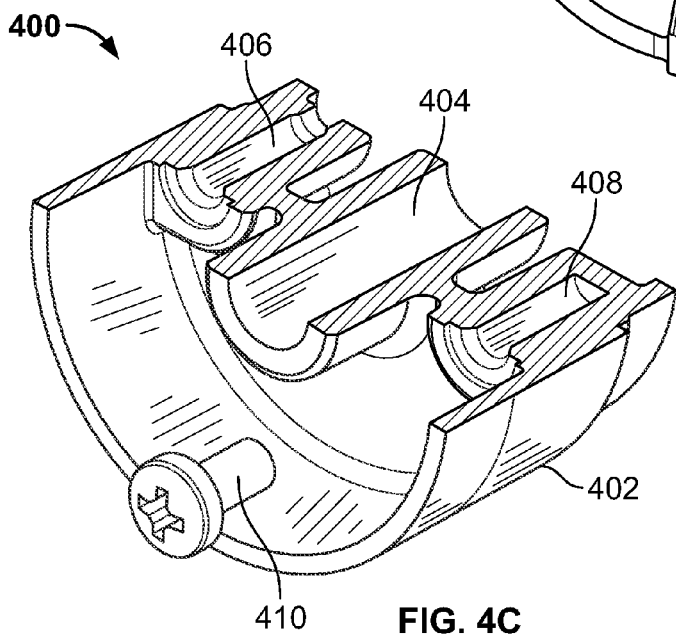
Figure 5:
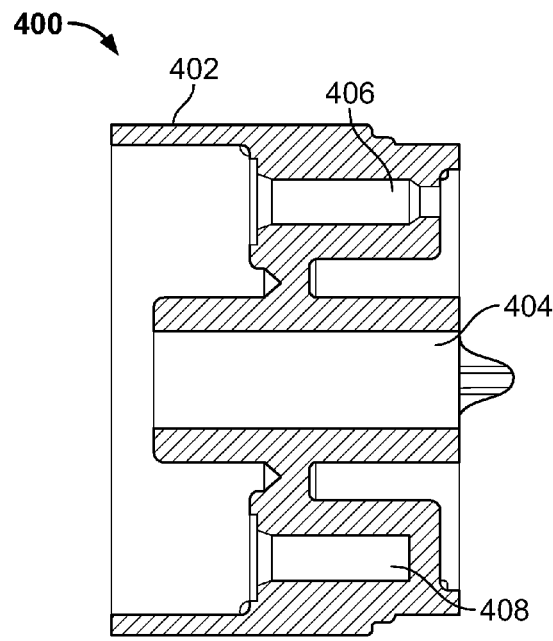
FIG. 5 is a cross-sectional view of the example stem guide depicted in FIGS. 4A, 4B, and 4C.

FIGS. 2 and 3 depict the interchangeable stem guide 132 of FIG. 1 in greater detail. As depicted in FIGS. 2 and 3, the stem guide 132 is disposed within a bore or passage 200 of the actuator casing 108. The stem guide 132 includes a passage or bore 202 to slidably receive and/or guide the valve stem 116. A plurality of seals 204 and 206 are disposed between an outer surface 208 of the stem guide 132 and an inner surface 210 of the actuator casing 108. The seals 204 and 206 frictionally engage the inner surface 210 of the actuator casing 108 to removably couple the stem guide 132 within the bore 200 of the actuator casing 108. The seals 204 and 206 apply a pre-load or force to (e.g., to be displaced or distorted against) the inner surface 210 of the actuator casing 108, substantially align (e.g., center) the stem guide 132 within the passage or bore 200 of the actuator casing 108 relative to the valve body 118 and the seat 124.

More specifically, the seals 204 and 206, which may be implemented using o-rings, may serve to provide a substantially equal inwardly directed force (e.g., toward the stem 116) to the stem guide 132, thereby substantially centering or otherwise aligning the stem guide 132 within the passage or bore 200. In this manner, the seals 204 and 206 can compensate for additional tolerance variations (e.g., tolerance stack ups) that result from having an interchangeable stem guide configuration (i.e., a stem guide that is not integral with the actuator casing 108). For instance, the additive or worst case tolerances of the stem guide 132 and the casing 108 can be compensated for via the elastomeric properties of the seals 204 and 206. Thus, the interchangeable stem guide 132 may be self-aligning in response to tolerance variations and/or other non-ideal characteristics of the body of the stem guide 132, the stem 116, and/or the casing 108.

In addition to providing a centering or aligning force to the stem guide 132, the seal 204 provides a pressure seal between the bore 200 of the actuator casing 108 and the ambient surrounding the actuator casing 108 as well as an outlet chamber 212 of the valve body 118. Similarly, the seal 206 provides a pressure seal between the outlet chamber 212 and the ambient surrounding the actuator casing 108 and the bore 200 of the actuator casing 108. Thus, in the case where the fluid regulator 100 is a gas regulator, potentially harmful gasses are prevented from being released into the ambient surrounding the regulator 100.

Further, because the seals 204 and 206 frictionally engage the inner surface 208 of the actuator casing 108, the stem guide 132 can be easily retained within the actuator casing 108 during assembly (e.g., factory assembly, field repair or reconfiguration, etc.) of the regulator 100. Still further, the forces applied by the seals 204 and 206 to the stem guide 132 also reduce or substantially eliminate play or movement between the stem guide 132 and the actuator casing 108. For example, axial and/or lateral play of movement of the stem guide 132 may be substantially reduced or eliminated.

While the seals 204 and 206 are depicted in the example of FIG. 3 as captured or seated against shoulders 300 and 302, the seals 204 and 206 could alternatively or additionally be captured, at least partially, in circumferential grooves or channels extending around the outer surface 208 of the stem guide 132 and/or the inner surface 210 of the casing 108. Additionally, while two seals 204 and 206 are shown, more than two seals or a single seal could be used instead.

Different fluid control applications may require or permit a fluid regulator to utilize internal pressure registration. When using internal pressure registration, control pressure (i.e., controlled output pressure) is sensed through a passage or passages fluidly coupling an outlet of the valve body to the actuator diaphragm. In contrast, if more precise control over downstream fluid pressure is needed for a particular application, external pressure registration is typically employed. When a fluid regulator is configured for external pressure registration, a downstream control pressure is typically fluidly coupled via an external line directly to a chamber associated with the regulator diaphragm (e.g., a chamber within the lower actuator casing). Also, typically, when a regulator is configured for external pressure registration, the bore or passage, in which the stem guide is disposed within the actuator casing, is blocked. This is commonly referred to as blocking the throat to prevent fluid pressure in the outlet of the valve from being fluidly coupled to the diaphragm. Finally, in applications in which dual registration (i.e., internal and external pressure registration) is required, the throat is not blocked (i.e., a fluid path between the outlet of the valve body and the lower diaphragm casing is provided) and an external line couples a downstream fluid pressure to the lower diaphragm casing.

In many known fluid regulators, different pressure registration configurations are achieved using numerous different regulator components. For example, different stem guides, actuator casings, etc. may be selected to provide a desired pressure registration configuration. In contrast to these known fluid regulators, FIGS. 4A, 4B, 4C, and 5 depict an example stem guide 400, which may be used to implement the stem guide 132 of FIG. 1, that enables a pressure regulator (e.g., the example regulator 100 of FIG. 1) to be configured (e.g., in the field using a standard screwdriver) for either internal or external pressure registration without having to provide any additional and/or different components.

As depicted in FIGS. 4A, 4B, 4C, and 5, the stem guide 400 has a substantially cylindrical body 402 having a bore or passage 404 to slidably receive a valve stem (e.g., the valve stem 116 of FIG. 1A). The stem guide 400 also includes another passage or bore 406 extending through the stem guide 400 to fluidly couple an outlet of a valve to a diaphragm of a fluid regulator. Still further, the stem guide 400 includes an aperture or opening 408 (e.g., a blind hole) that is to hold an insert member 410, which is depicted as a screw in FIG. 4C. Thus, to configure a fluid regulator for internal pressure registration, the screw 410 may be coupled to the opening 408 so that the passage 406 is open (i.e., unblocked) to fluidly couple an outlet of a valve to an actuator diaphragm of a fluid regulator.

On the other hand, to configure a fluid regulator for external pressure registration, the screw 410 may be removed from the opening 408 and coupled (e.g., threaded) to the passage 406 to block the passage 406 and prevent fluid communication between the outlet of the valve and the diaphragm. Although not shown in FIG. 4C, an o-ring or other seal may be included under the head of the screw 410 to ensure a pressure-tight sealing of the passage or bore 406. The pressure registration configuration apparatus or feature of the example stem guide 400 of FIGS. 4A, 4B, 4C, and 5 can be used separately as shown in FIGS. 4A, 4B, 4C, and 5 or may be combined with the features (e.g., the circumferential seals 204 and 206) of the example stem guide 132 described above in connection with FIGS. 2 and 3.

Figure 6:
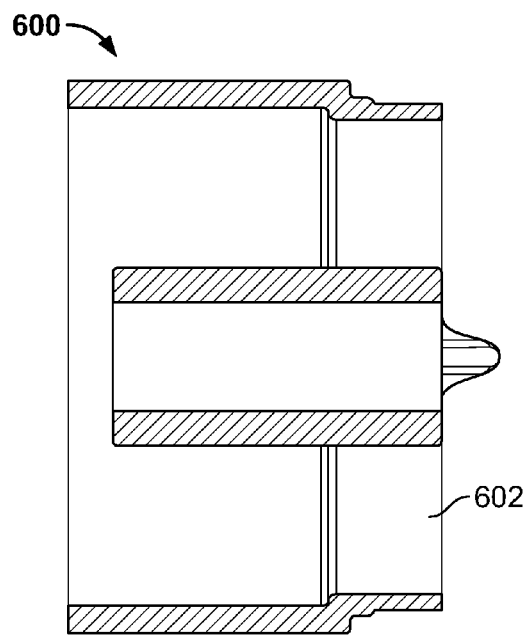
FIG. 6 illustrates yet another example stem guide that may be used with the example regulators described herein.

FIG. 6 illustrates another example stem guide 600 that may be used with the example regulators described herein. The example stem guide 600 is an open throat design having a passage 602 that fluidly communicates or couples an outlet pressure from a valve to an actuator diaphragm. Thus, the example stem guide 600 may be used instead of (or interchanged with) the example stem guide 132 in the example regulator 100 (FIG. 1) to provide internal pressure registration without an option to field configure the regulator 100 for external registration. Additionally, the passage 602 is relatively large and, thus, facilitates and/or improves performance of the example regulator 100 when the example regulator 100 is configured for internal pressure registration. Although not shown in FIG. 6, the example stem guide 600 may be implemented with seals such as the example seals 204 and 206 described in connection with FIGS. 2 and 3.

Figure 7:
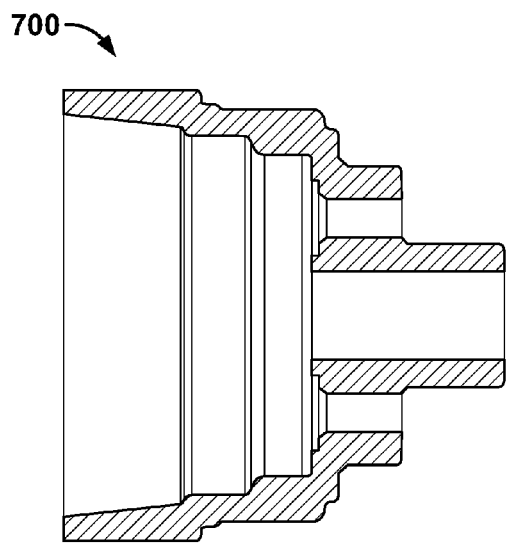
FIG. 7 illustrates yet another example stem guide that may be used with the example regulators described herein.

FIG. 7 illustrates yet another example stem guide 700 that may be used with the example regulators described herein. The example stem guide 700 is sized and configured to facilitate the use of a pressure-balanced valve mechanism such as the example balance valve mechanism depicted in FIG. 25. Additionally, as with the example stem guide 600, the example stem guide 700 may be implemented with seals such as the example seals 204 and 206 described in connection with FIGS. 2 and 3.

As stated above, the example fluid regulators described herein incorporate highly modular diaphragm assemblies that can be configured and/or interchanged to satisfy a wide range of different applications and/or operational requirements. For example, a first diaphragm assembly selected from a plurality of diaphragm assemblies provides a first operational characteristic different from a second operational characteristic provided by a second diaphragm selected from the pluralities of diaphragm assemblies. For example, a first diaphragm assembly may configure a regulator to have a full internal relief and a second diaphragm assembly may configure a regulator to have a token relief. To provide different operational characteristics, the example modular diaphragm assemblies described herein include a plurality of interchangeable relief valve seats, relief valve stems, pusher post assemblies, and valve levers.

Figure 8:
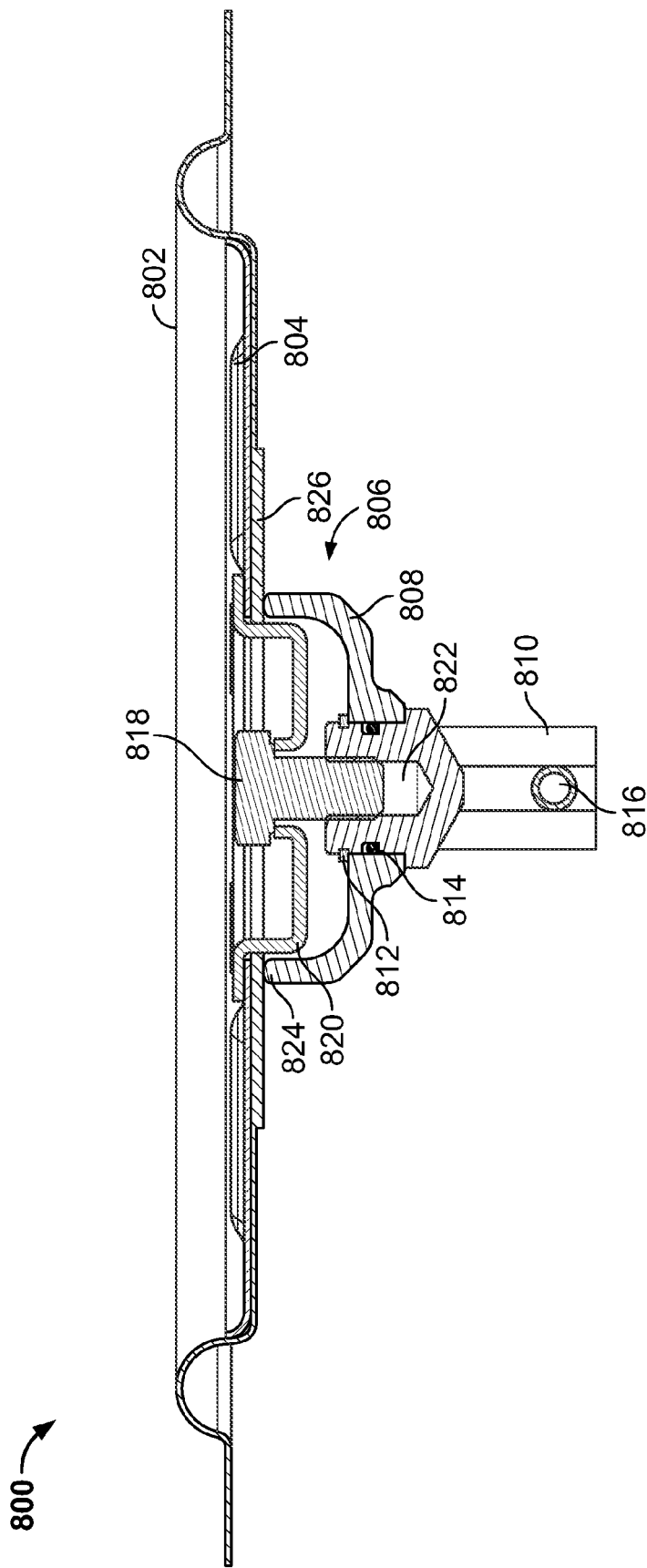
FIG. 8 illustrates an example diaphragm assembly that may be used to implement the example regulators described herein to have no internal pressure relief.

FIG. 8 illustrates an example modular diaphragm assembly 800 that may be used to implement example regulators described herein to have no internal pressure relief. The example diaphragm assembly 800 includes a diaphragm 802 and a diaphragm plate 804 to provide a rigid backing to the diaphragm 802 to maintain a substantially constant effective area (e.g., piston diameter or area) during operation. The example diaphragm assembly 800 includes a non-operative relief valve assembly 806 coupled to the diaphragm 802 such that the relief valve assembly 806 is prevented from opening and providing internal pressure relief, thereby providing a non-relief assembly. Thus, the diaphragm assembly 800 configures a regulator for use in applications that do not require a pressure relief, or an internal pressure relief (i.e., applications requiring external pressure relief).

The non-operative relief valve assembly 806 includes a relief valve seat 808 sealingly coupled to a pusher post 810 via a retainer ring 812 and an o-ring 814. The pusher post 810 includes a lever pin 816 pivotally coupled to a lever arm (e.g., the lever arm 117 of FIG. 1) to translate movement of the diaphragm assembly 800 into movement of a valve disk (e.g., the valve disk 130) relative to a valve port (e.g., the valve port 124) to vary the flow of fluid through a regulator (e.g., the regulator 100). A fastener 818 (e.g., a bolt) passes through a recessed portion 820 of the diaphragm plate 804 and couples to (e.g., threadably engages) an opening 822 of the pusher post 810 to cause a rim or sealing edge 824 of the relief valve seat 808 to seal against a relatively thicker sealing surface 826 of the diaphragm 802.

Figure 9:
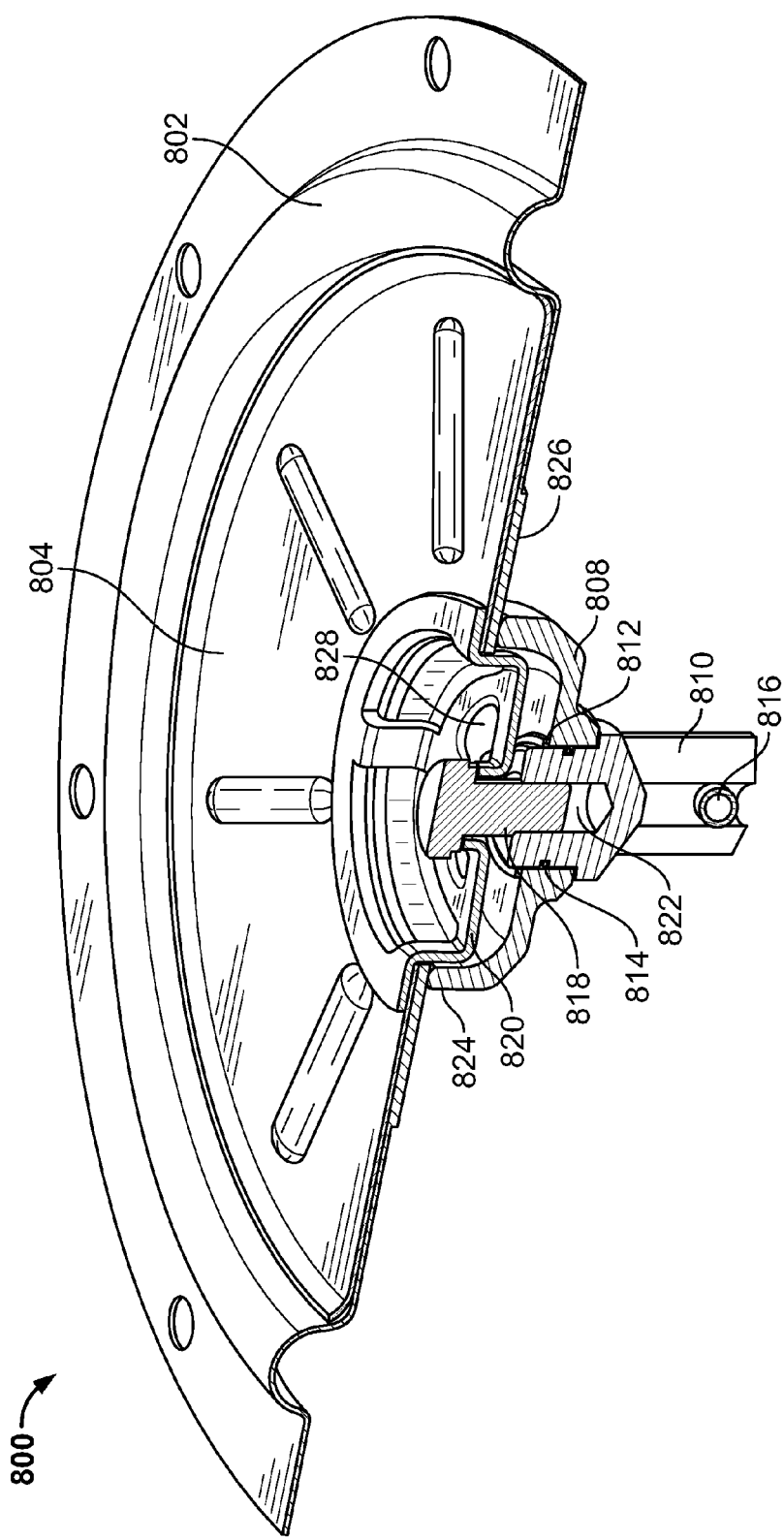
FIG. 9 is another view of the example diaphragm assembly of FIG. 8.

FIG. 9 is another view of the example diaphragm assembly 800 of FIG. 8. As shown in FIG. 9, the example diaphragm assembly 800 is circular in shape. However, in other examples, any other suitable shapes may be employed. Additionally, the recessed portion 820 of the diaphragm plate 804 includes an opening 828, which can function as a relief valve passage for assemblies (e.g., those described in detail below) that do not fix the diaphragm plate 804 to the pusher post 810 to prevent internal relief operation.

Figure 10:
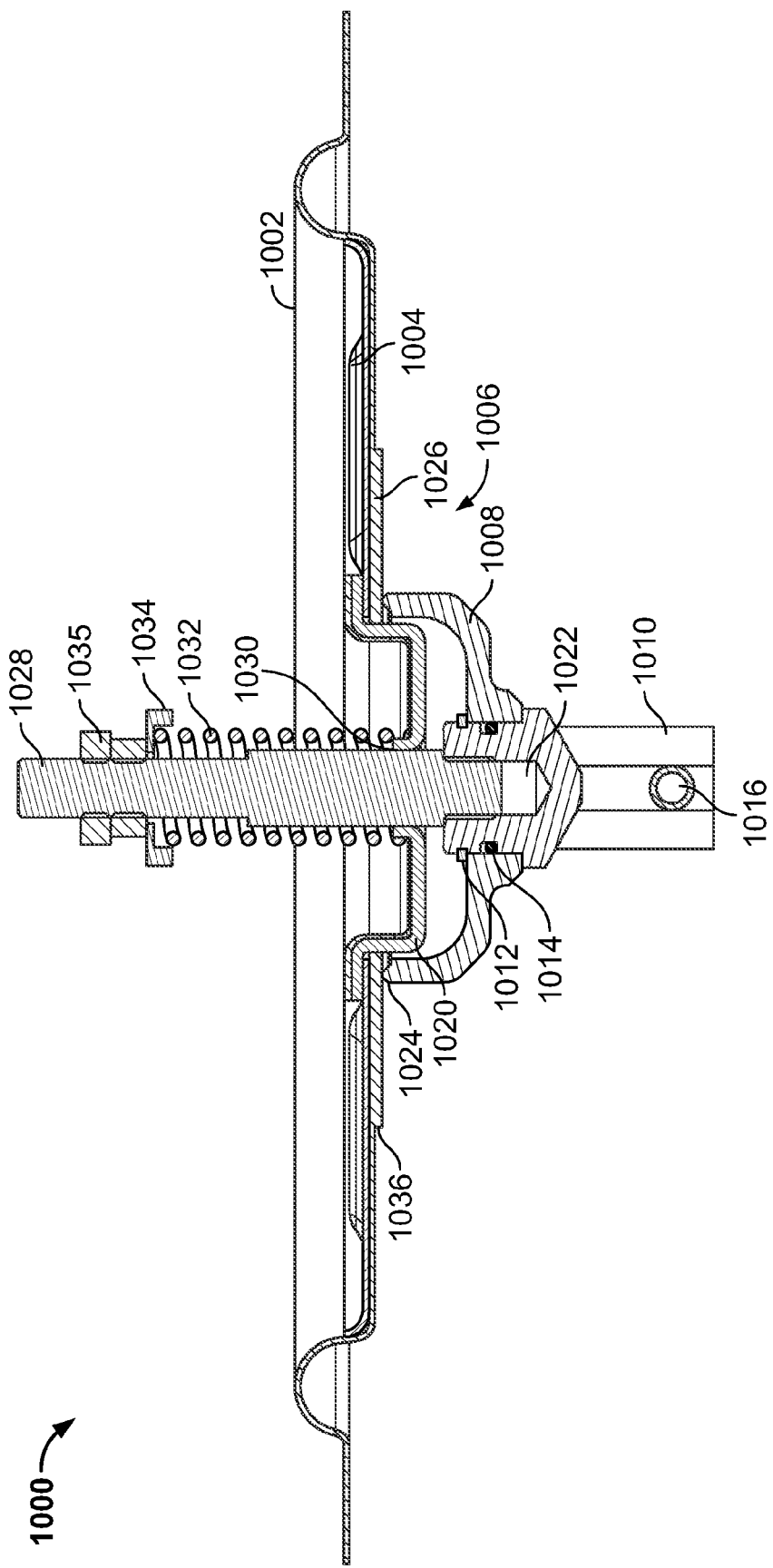
FIG. 10 illustrates yet another example diaphragm assembly that may be used to implement the example regulators described herein to have token internal pressure relief.

FIG. 10 illustrates another example diaphragm assembly 1000 that may be used to implement the example regulators described herein to have token internal pressure relief. Similar to the example assembly 800 of FIGS. 8 and 9, the example diaphragm assembly 1000 includes a diaphragm 1002 and a diaphragm plate 1004. The example diaphragm assembly 1000 also includes a relief valve assembly 1006 having a relief valve seat 1008, a pusher post 1010, a retainer ring 1012, an o-ring 1014, and a lever pin 1016. Additionally, the diaphragm plate 1004 includes a recessed portion 1020. The relief valve seat 1008 has a sealing rim or edge 1024 that sealingly engages a relatively thicker diaphragm portion 1026 of the diaphragm 1002.

However, in contrast to the example diaphragm assembly 800, the relief valve assembly 1006 is operative. In particular, instead of a fastener (e.g. the bolt 818 of FIG. 8), the example assembly 1000 includes a relief valve stem 1028 slidably coupled within an opening 1030 of the diaphragm plate 1004 and the diaphragm 1002. Additionally, a portion of the relief valve stem 1028 engages an opening 1022 of the pusher post 1010 to operatively couple the relief valve stem 1028 the pusher post 1010. A relief valve spring 1032 is captured between a retainer 1034 and the adjuster 1035 and the diaphragm plate 1004 to provide a desired pre-load to establish a desired pressure relief point or discharge pressure. The retainer 1034 and the adjuster 1035 engage or couple to the relief stem 1028 at a distance from the diaphragm plate 1004. The adjuster 1035 may be a threaded nut or the like that can be threaded onto the valve stem 1028 to preload the spring 1032 as needed to set a relief pressure.

In operation, when the control pressure applies a sufficient force to a control side 1036 of the diaphragm 1002 to exceed the pre-load force applied by the spring 1032, the thicker diaphragm portion 1026 lifts away, disengages, or moves out of sealing engagement with the sealing rim or edge 1024 of the relief valve seat 1008. As a result, pressurized fluid on the control pressure side 1036 of the diaphragm 1002 travels past the rim or edge 1024 and through an opening (e.g., similar to the opening 828 depicted in FIG. 8) in the recessed portion 1020 of the diaphragm plate 1004. The pressurized fluid passing through the relief valve assembly 1006 may then subsequently be routed to the atmosphere.

Figure 11:
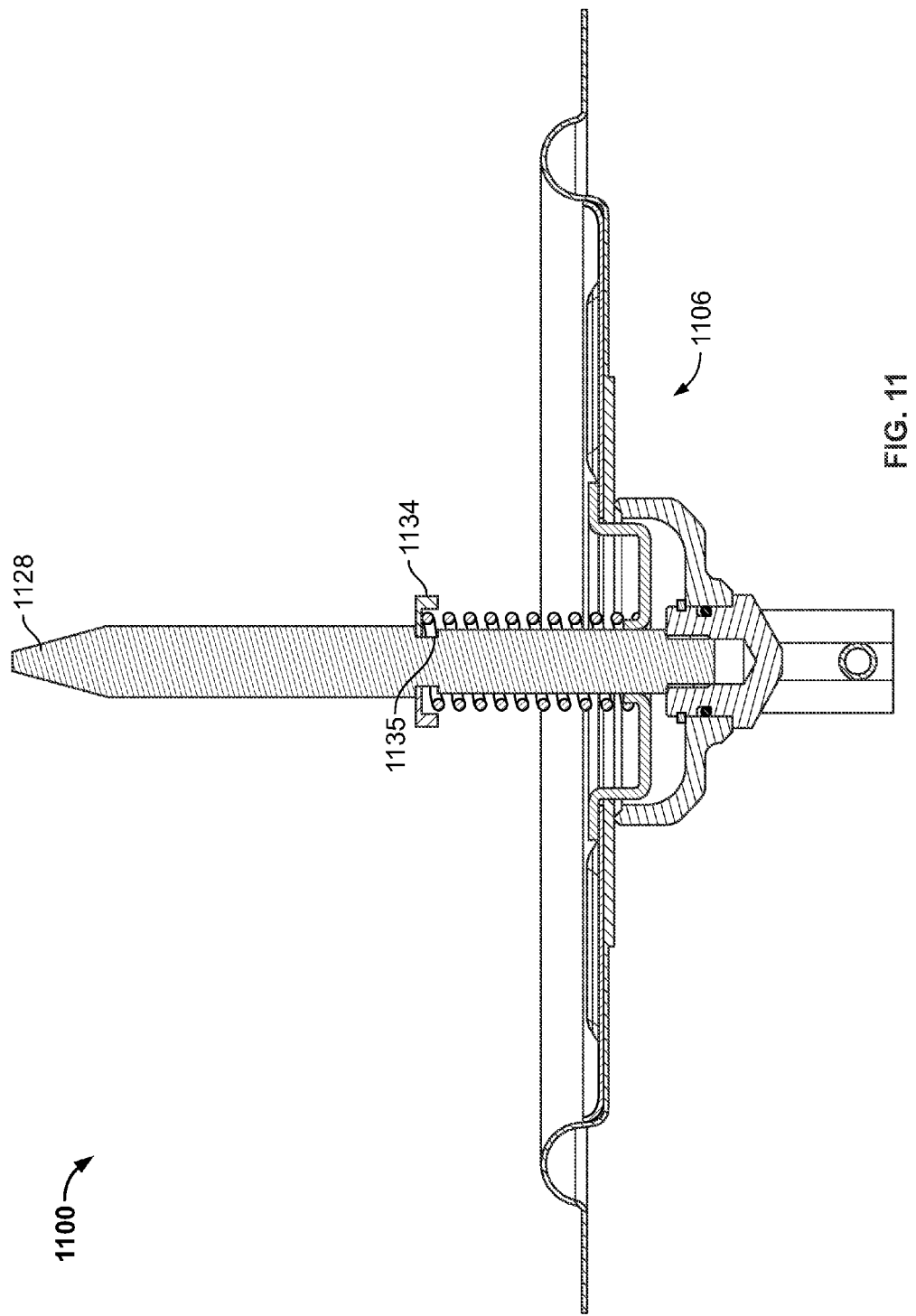
FIG. 11 illustrates yet another example diaphragm assembly that may be used to implement the example regulators described herein to have full internal pressure relief.

FIG. 11 illustrates yet another example diaphragm assembly 1100 that may be used to implement the example regulators described herein to have full internal pressure relief. The assembly 1100 is similar to the diaphragm assembly 1000 of FIG. 10, except the assembly 1100 includes a relief valve assembly 1106 having a relief valve stem 1128 and a retainer 1134. The retainer 1134 couples to the relief stem 1128 via a groove or slot 1135 of the relief stem 1128. In this manner, the retainer 1134 is fixed (e.g., fixed in place) to the stem 1128 such that the relief valve assembly 1106 can provide full (i.e., not just token) internal pressure relief.

Figure 12:
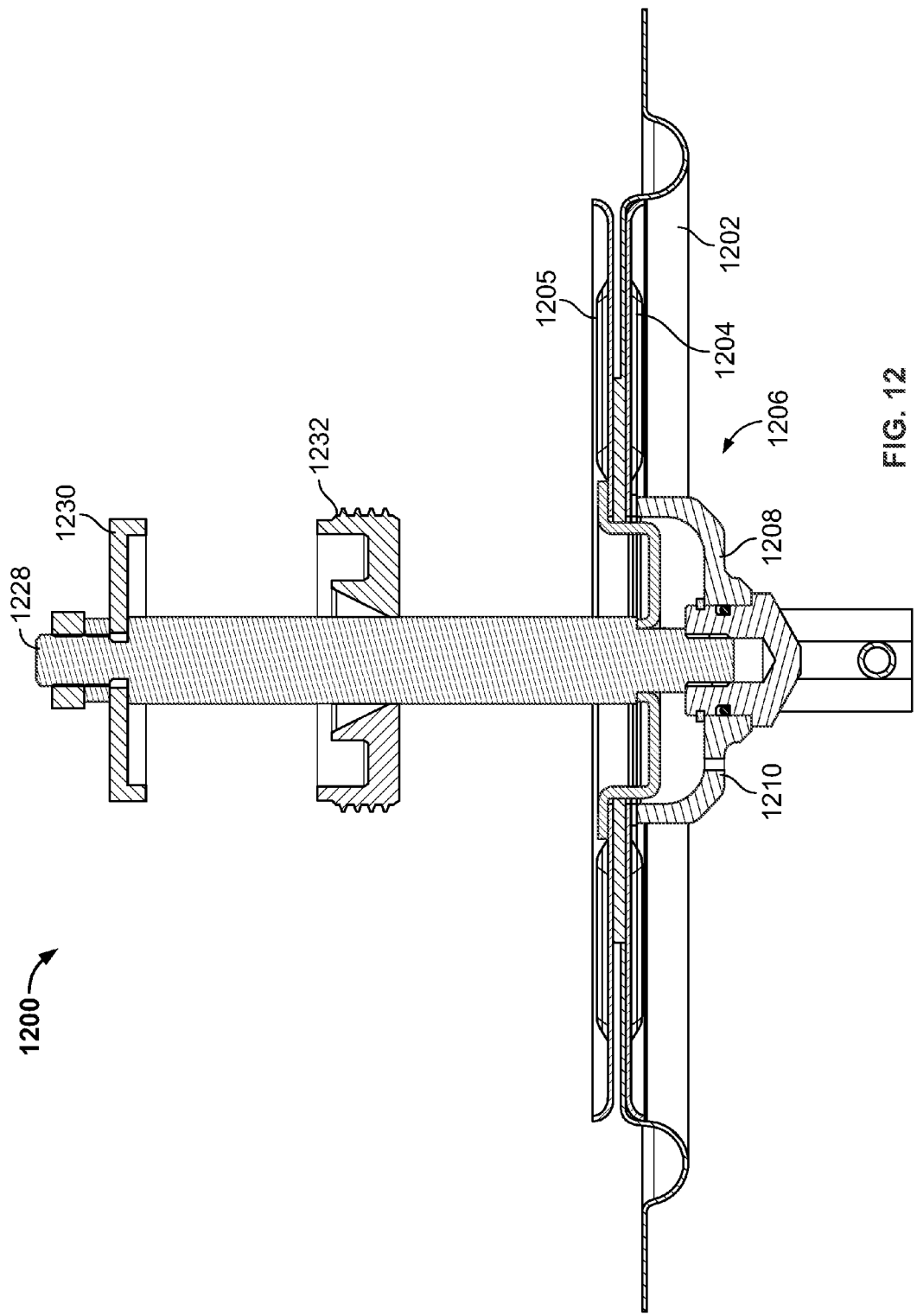
FIG. 12 illustrates yet another example diaphragm assembly that may be used to implement the example regulators described herein to have a pressure loaded diaphragm.

FIG. 12 illustrates another example diaphragm assembly 1200 that may be used to implement the example regulators described herein to have a pressure loaded diaphragm. In contrast to the example diaphragm assemblies 1000 and 1100 of FIGS. 10 and 11, respectively, the example diaphragm assembly 1200 includes a diaphragm 1202 that is installed in an opposite orientation (e.g., upside down) relative to the diaphragms 1002 and 1102 of FIGS. 10 and 11. In this manner, the upper casing of the regulator is pressurized to provide a loading element, thereby improving regulator performance.

Additionally, the example diaphragm assembly 1200 includes a first diaphragm plate 1204 and a second diaphragm plate 1205, which can be omitted if desired, to ensure the diaphragm 1202 provides a substantially constant active surface area in response to pressures being applied to both sides of the diaphragm 1202. Further, in contrast to the previous examples, the example diaphragm assembly 1200 includes a pressure relief assembly 1206. The pressure relief assembly 1206 includes a relief valve seat 1208 having a fixed size bleed hole or passage 1210. A closing stem 1228 seals the seat 1208 against the diaphragm 1202 to provide no relief operation between the seat 1208 and the diaphragm 1202. A closing spring (not shown) may be disposed between an upper spring seat 1230 and a lower spring seat 1232 to provide a mechanical fail-safe closing of a valve to which the example diaphragm assembly 1200 is operatively coupled.

Figure 13:
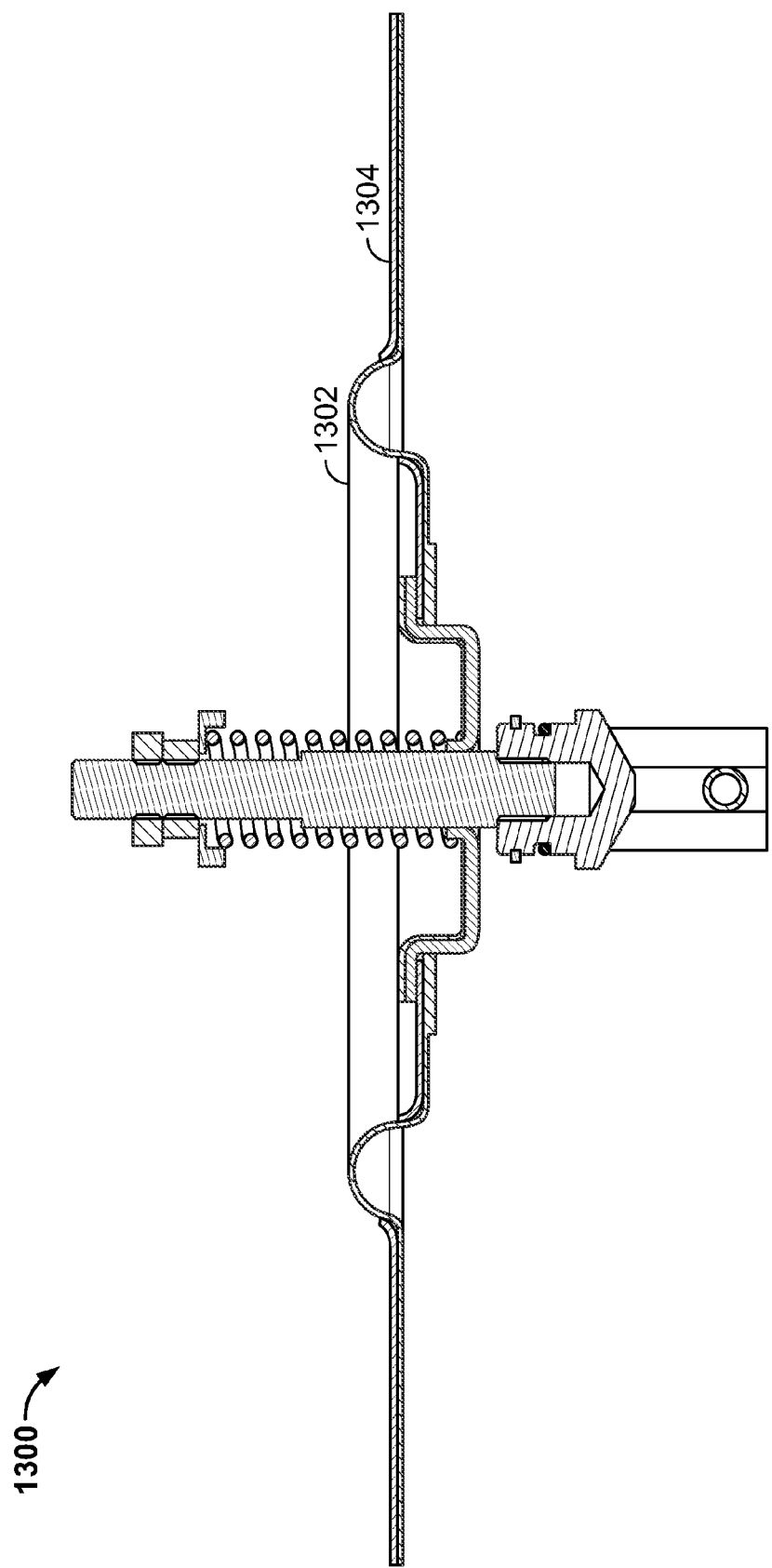
FIG. 13 illustrates a high pressure diaphragm assembly that may be used to implement the example regulators described herein.

FIG. 13 illustrates an example high pressure diaphragm assembly 1300 that may be used to implement the example regulators described herein. The example diaphragm assembly 1300 includes a diaphragm 1302 and a restrictor plate 1304 that cooperate so that the diaphragm assembly 1300 has a relatively small effective area, thereby providing maximum resistance for high pressure applications. The example assembly 1300 is shown without a relief valve seat. However, such a seat could be included in a manner similar to that shown in FIG. 11.

Figure 14:
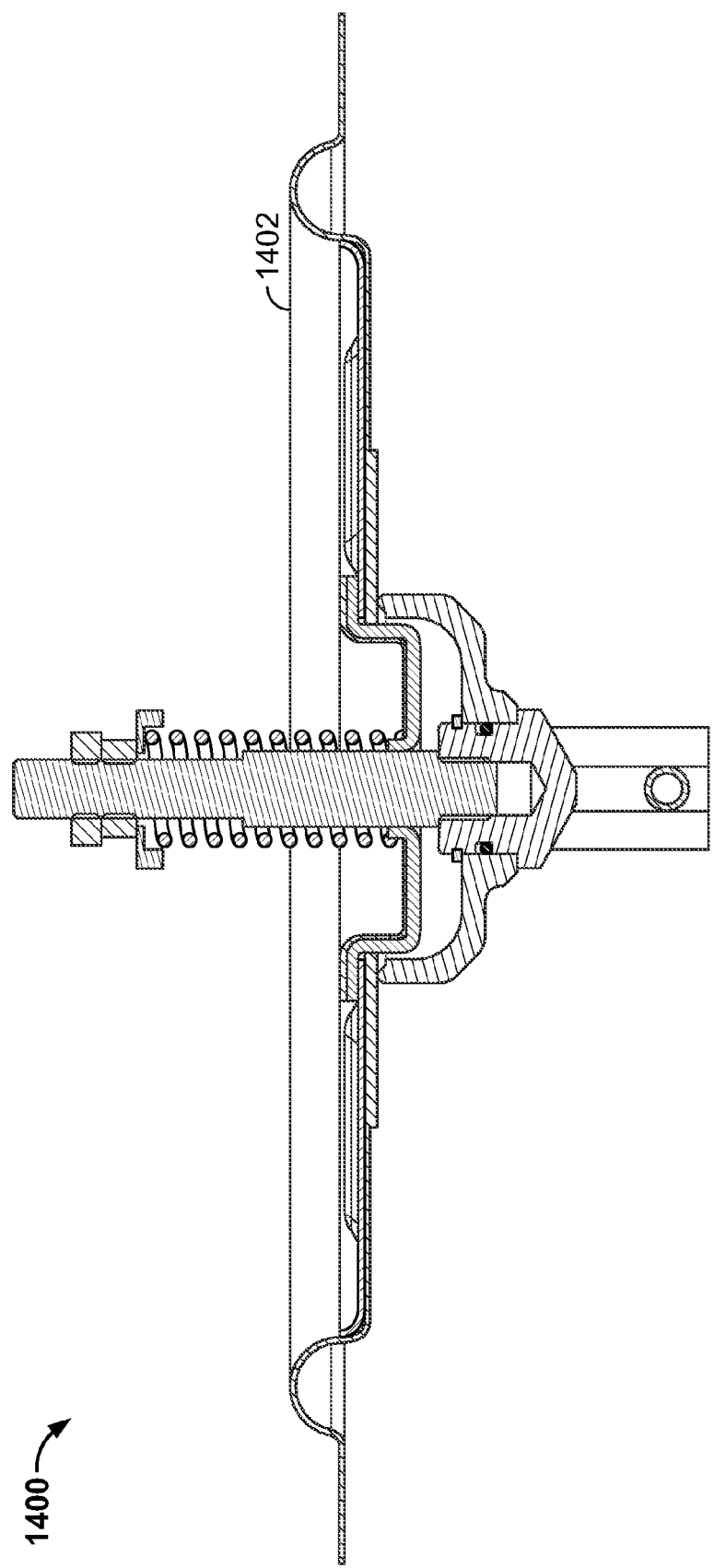
FIG. 14 illustrates a low pressure diaphragm assembly that may be used to implement the example regulators described herein.
Figure 15:
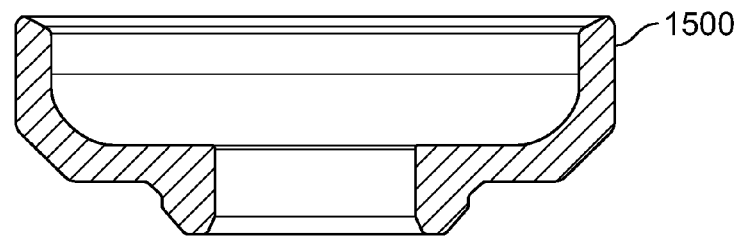
FIGS. 15-18 illustrate example relief valve seats that may be interchangeably used to implement the example regulators described herein.
Figure 16:
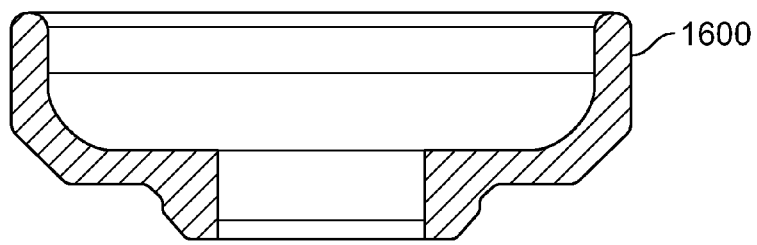
Figure 17:
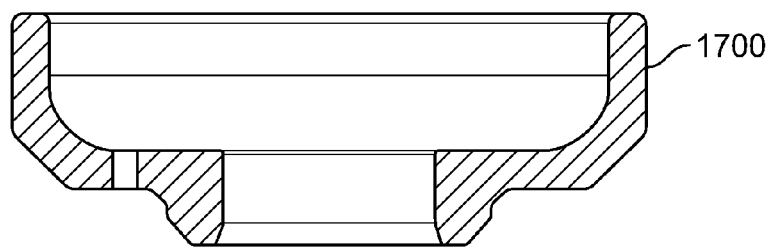
Figure 18:
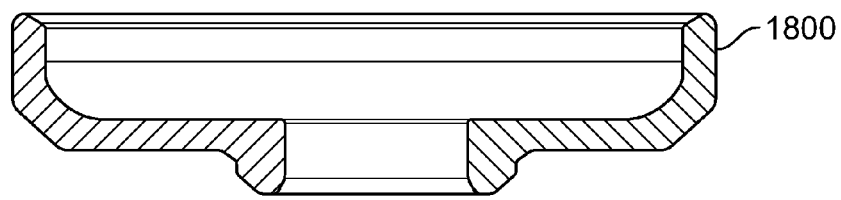

FIG. 14 illustrates an example low pressure diaphragm assembly 1400 that may be used to implement the example regulators described herein. The example assembly 1400 includes a diaphragm 1402 having a relatively large effective area for use in applications requiring sensitivity to low pressures.

FIGS. 15-18 illustrate respective example seats 1500, 1600, 1700, and 1800 that may be interchangeably used to implement the example regulators described herein. The example seat 1500 is a general purpose relief valve seat that may be used, for example, in a relief diaphragm assembly such as that shown in FIGS. 10 and 11. The example seat 1600 is a general purpose non-relief valve seat that may be used, for example, in a non-relief diaphragm assembly such as that shown in FIG. 8. The example seat 1700 is a general purpose seat having a fixed restriction or bleed hole that may be used, for example, in pressure loaded configurations such as that shown in FIG. 12. The example seat 1800 is a high capacity relief valve seat.

Figure 19:
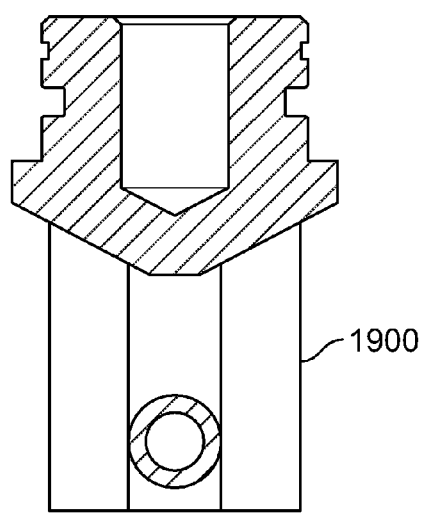
FIGS. 19 and 20 illustrate example pusher posts that may be interchangeably used to implement the example regulators described herein.
Figure 20:
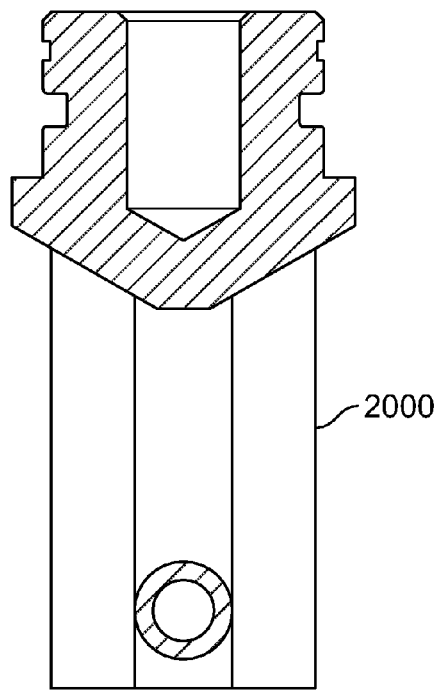

FIGS. 19 and 20 illustrate example pusher posts 1900 and 2000 that may be interchangeably used to implement the example regulators described herein. The example pusher post 1900 is configured to enable its connection or coupling to a relatively longer lever arm to provide a high lever ratio and, thus, is particularly useful in non-pressure balanced regulator applications. In contrast, the example pusher post 2000 is configured to enable its connection or coupling to a relatively shorter lever arm to provide a relatively low lever ratio and, thus, is particularly useful in pressure balanced regulator applications.

Figure 21:
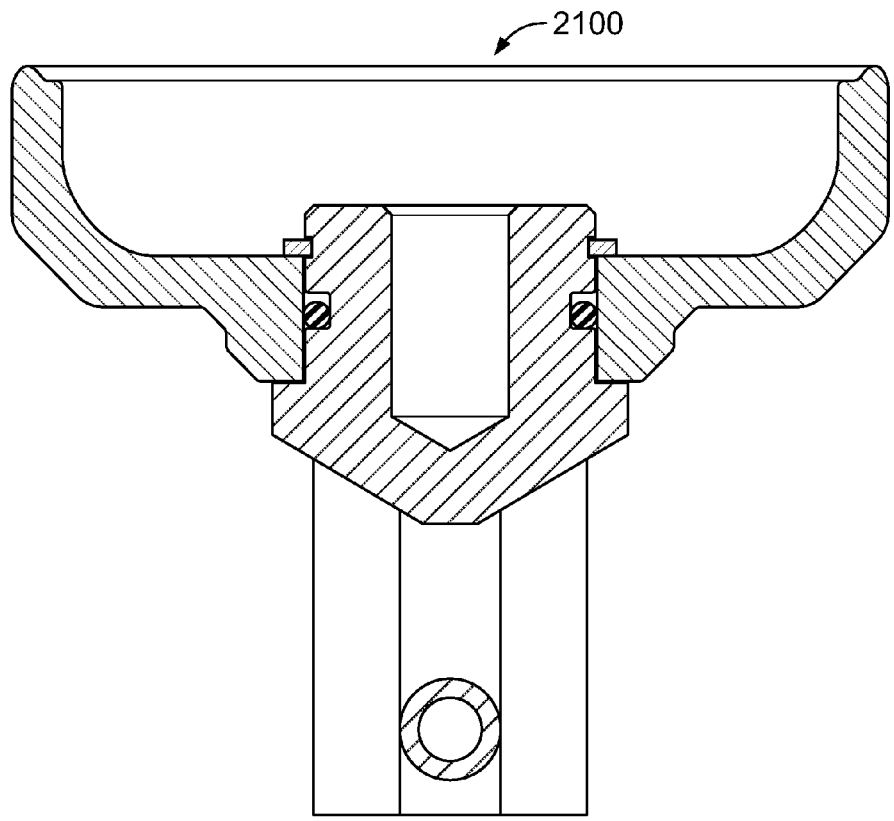
FIG. 21 illustrates an example pusher post/relief valve seat assembly that may be used to implement the example regulators described herein.

FIG. 21 illustrates yet another example pusher post/relief valve seat assembly 2100 that may be used to implement the example regulators described herein.

Figure 22:
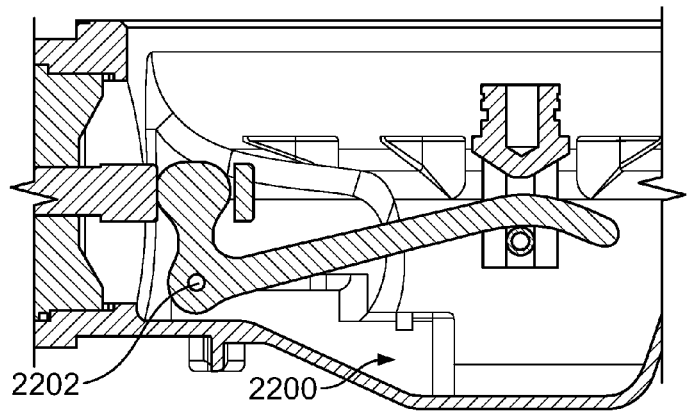
FIGS. 22-24 illustrate example valve lever assemblies that may be used to implement the example regulators described herein.
Figure 23:
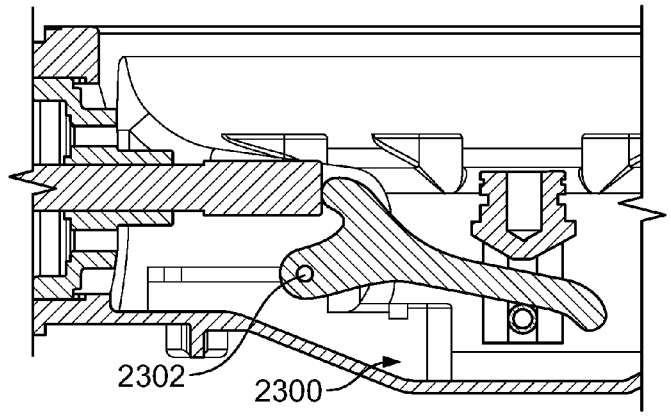
Figure 24:
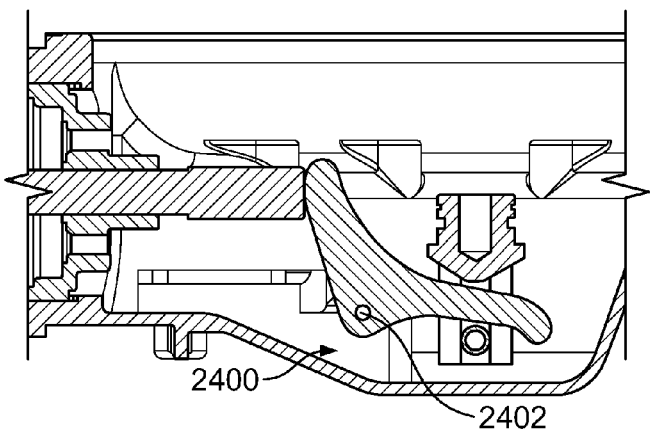

FIGS. 22-24 illustrate example valve lever assemblies 2200, 2300, and 2400 that may be used to implement the example regulators described herein. The example valve lever assembly 2200 is a high lever ratio assembly that provides maximum resistance to fluid forces and is typically used to control non-pressure balanced valves. The example valve lever assembly 2300 provides a somewhat lower lever ratio than that provided by the assembly 2200 of FIG. 22 and is typically used to accommodate high control pressure applications with pressure balanced valves. The example valve lever assembly 2400 provides a lower lever ratio than that provided by the assembly 2300 of FIG. 23 and may be particularly useful in controlling pressure balanced valves.

Additionally, a lower actuator casing (e.g., the casing 108) includes a plurality of mounting locations or positions to receive lever arm pivot pins 2202, 2302, and 2402, thereby enabling a single lower casing to be more flexibly adaptable to the needs of different applications (e.g., high pressure applications, low pressure applications, pressure-balanced applications, etc.). For example, the a plurality of slots and/or other openings to receive the pins 2202, 2302, and 2402 may be provided in locations corresponding to different levers providing different lever ratios and the pins 2202, 2302, and 2402. The pins 2202, 2302, and 2402 may be held in place (e.g., in a slot, hole, opening, etc.) using one or more screws, crimping of the sides or walls of the slots, openings, etc., or using any other suitable fastening method(s).

The foregoing example stem guides, diaphragm assemblies, and valve lever assemblies can be interchangeably combined for use within a single or relatively few regulator casings to provide a highly modular regulator product line. More specifically, the interchangeability of the foregoing assemblies and related components enables a wide range of global regulator applications (e.g., performance requirements, operational characteristics, etc.) to be satisfied using relatively few components. Further, the interchangeability of the foregoing assemblies and related components facilitates the provision of regulators having combinations of operational and/or performance characteristics that have not been previously provided.

Figure 25:
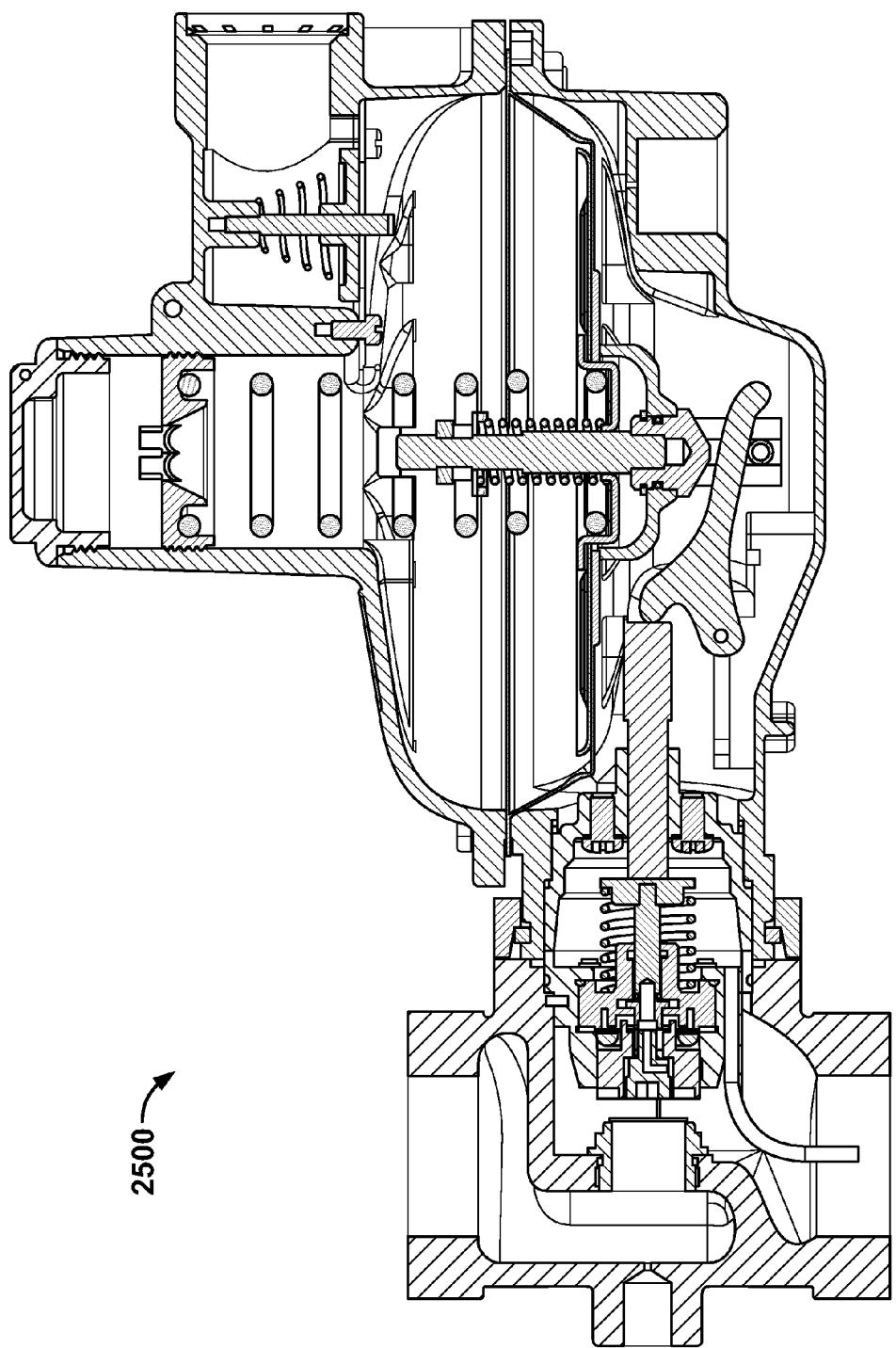
FIG. 25 illustrates an example pressure balanced fluid regulator that may be implemented in accordance with the examples described herein.

FIG. 25 illustrates an example pressure balanced fluid regulator 2500 that may be implemented in accordance with the examples described herein.

Figure 26:
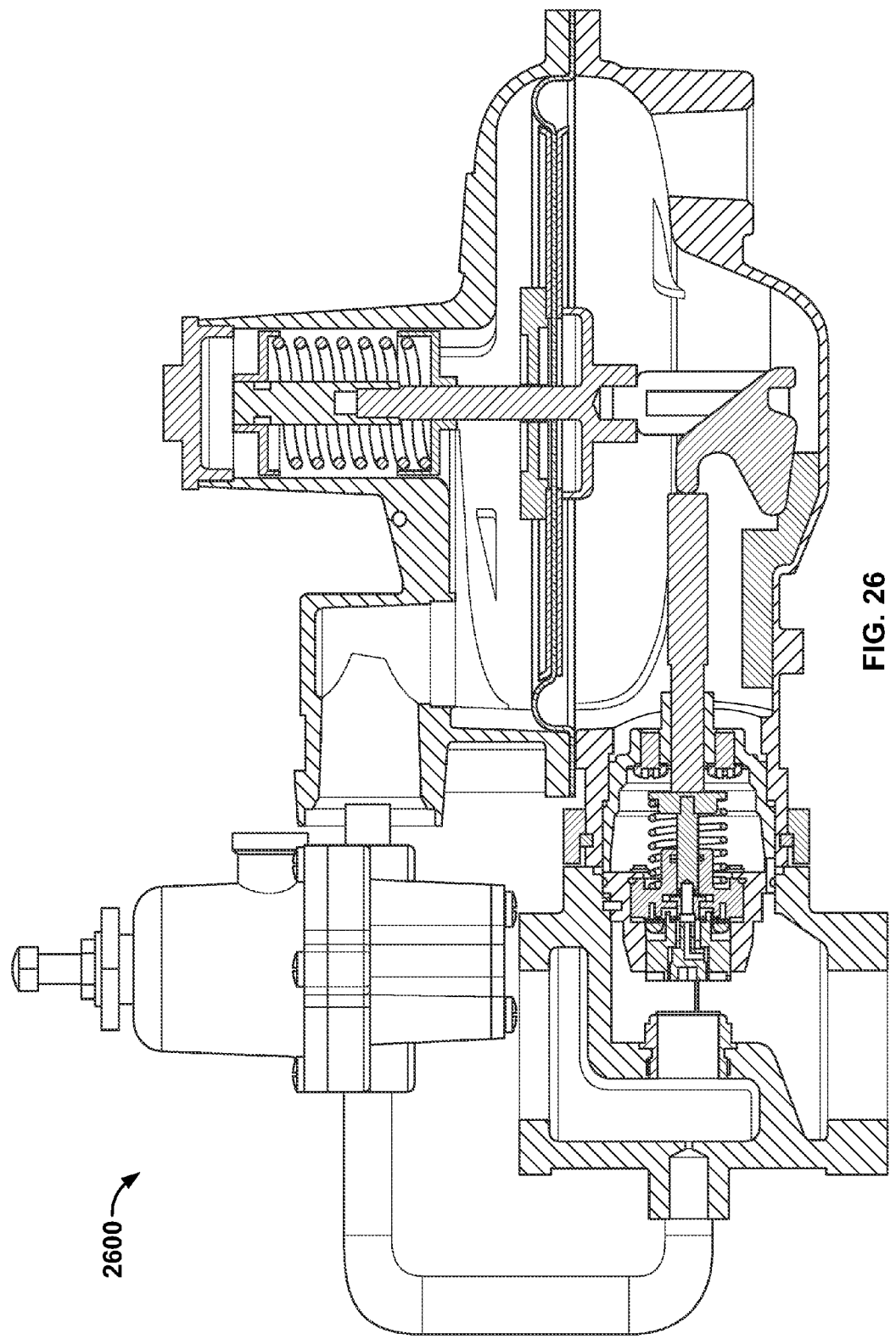
FIG. 26 illustrates an example pressure balanced and pressure loaded fluid regulator that may be implemented in accordance with the examples described herein.

FIG. 26 depicts an example pressure balanced and pressure loaded fluid regulator 2600 that may be implemented in accordance with the examples described herein.

Figure 27:
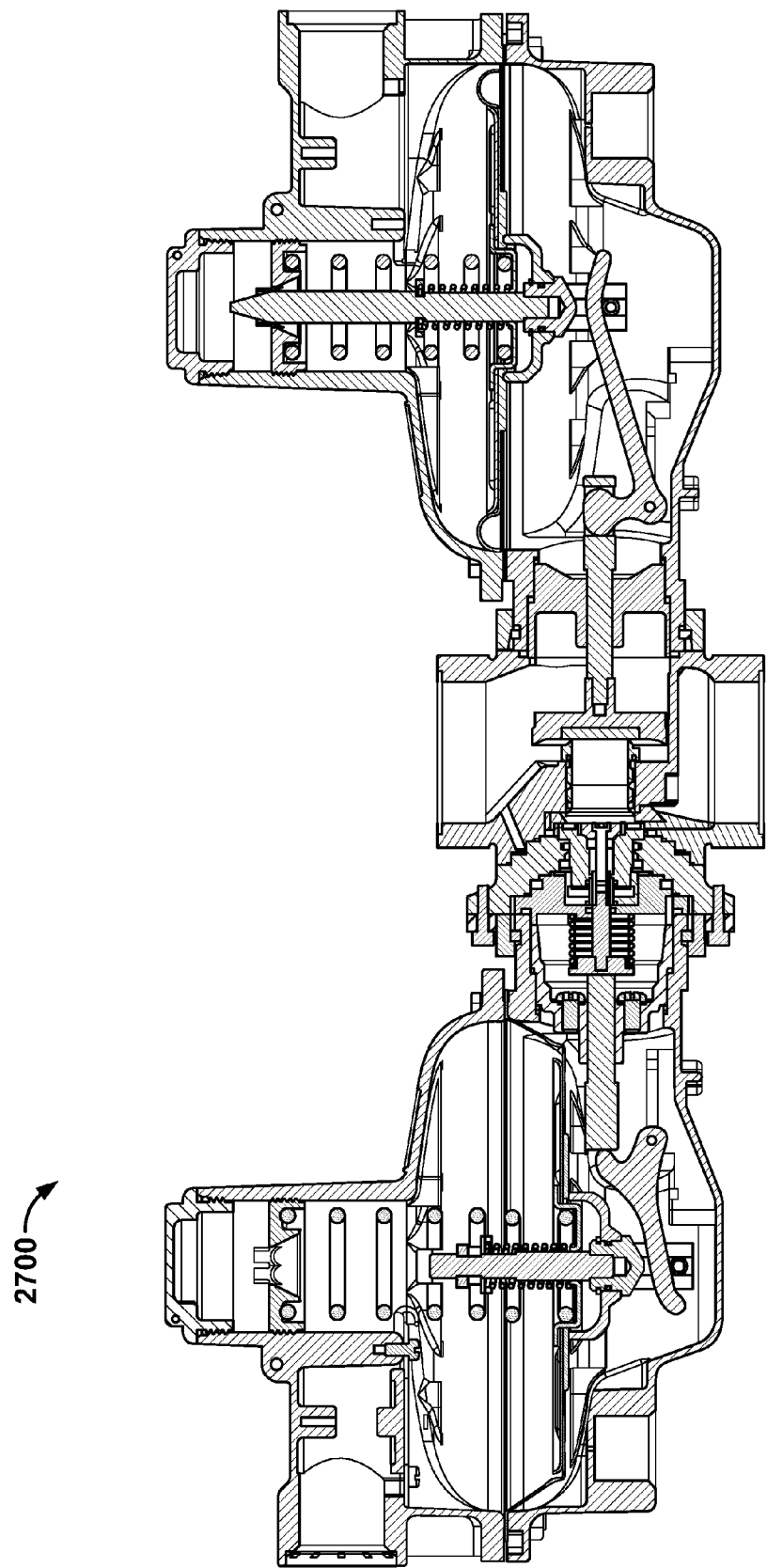
FIG. 27 illustrates an example integral monitor over pressure protection configuration that may be implemented in accordance with the examples described herein.

FIG. 27 illustrates an example integral monitor over pressure protection configuration 2700 that may be implemented in accordance with the examples described herein.

Figure 28:
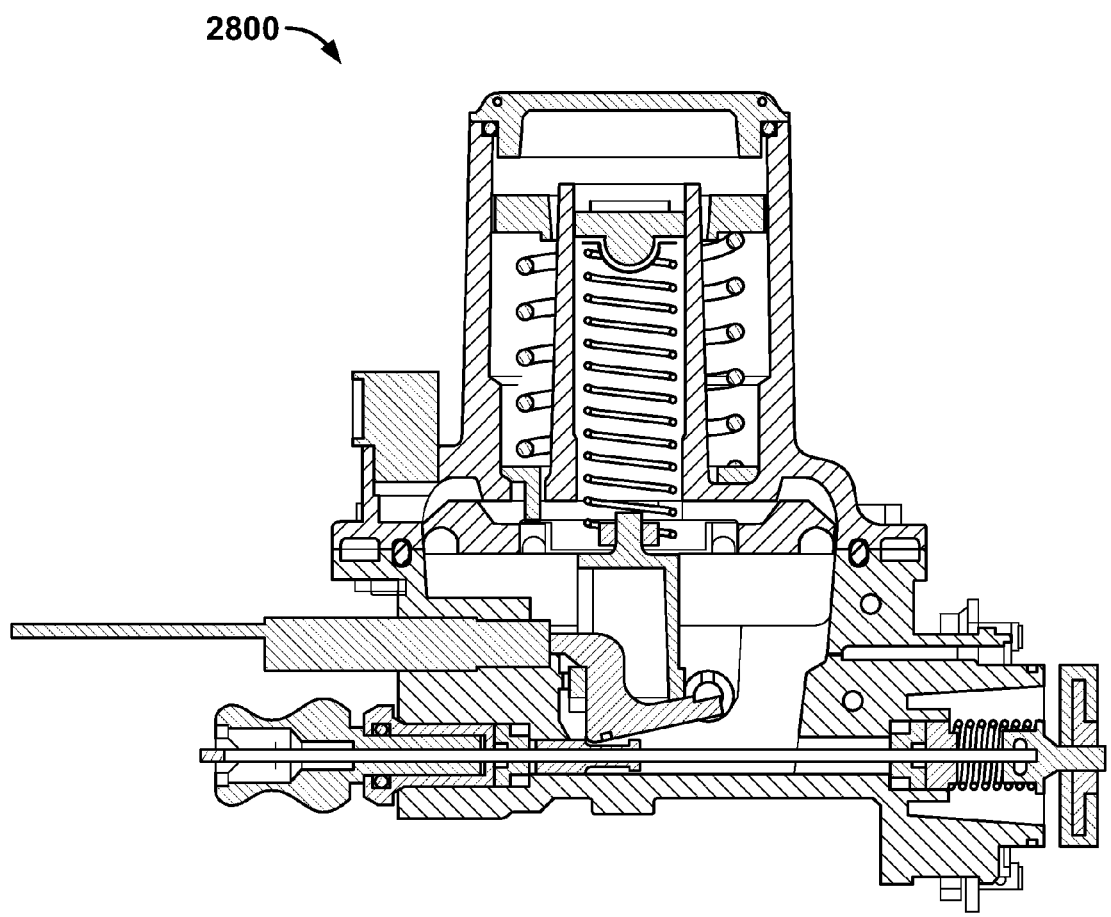
FIG. 28 illustrates an example safety shutoff device that may be used with the example regulators described herein.

FIG. 28 illustrates an example safety shutoff device 2800 that may be used with the example regulators described herein.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. A stem guide for use with a fluid regulator, comprising:
a body having an opening to slidably receive a valve stem and an outer surface having a plurality of circumferential seals that removably couple the body within a bore of a regulator casing and align the body with the regulator casing or a valve, the body having a passage extending through the body to fluidly couple an outlet of the valve to a chamber of the fluid regulator and an aperture to hold an insert member, wherein the insert member is to be removed from the aperture and coupled to the passage extending through the body to block fluid communication between the outlet and the chamber of the fluid regulator.

2. A stem guide as defined in claim 1, wherein the body or the regulator casing comprises a plurality of shoulders or grooves to retain the circumferential seals.

3. A stem guide as defined in claim 1, wherein the body is configured to facilitate use of a pressure-balanced valve mechanism.

4. A stem guide as defined in claim 1, wherein the circumferential seals are o-rings.

5. A stem guide as defined in claim 4, wherein the o-rings provide a seal between the outer surface of the body and an internal surface of the regulator casing.

6. A stem guide as defined in claim 4, wherein the o-rings apply a pre-load to the stem guide to reduce axial play between the stem guide and the regulator casing.

7. A fluid regulator, comprising:
a first diaphragm assembly disposed within an actuator casing;
a valve body coupled to the actuator casing;
a stem guide removably coupled within the actuator casing and having a first passage to guide a valve stem operatively coupled to the first diaphragm assembly and a second passage extending through the stem guide to fluidly couple an outlet of the valve body to a diaphragm of the first diaphragm assembly, the stem guide having an opening to retain a removable insert to be removed from the opening and positioned at least partially in the second passage extending through the stem guide to configure the fluid regulator for external pressure registration; and
a plurality of seals to align the stem guide with the actuator casing and the valve body, wherein a first seal from the plurality of seals is to be disposed between an outer surface of the stem guide and a first shoulder defined by an inner surface of the actuator casing, and a second seal from the plurality of seals is to be disposed between the outer surface of the stem guide and a second shoulder defined by an inner surface of the valve body.

8. A fluid regulator as defined in claim 7, wherein the each of the seals comprises an o-ring.

9. A fluid regulator as defined in claim 7, wherein the seals frictionally engage the actuator casing to retain the stem guide within the actuator casing.

10. A fluid regulator as defined in claim 7, wherein the removable insert comprises a screw and the second passage comprises threads, and wherein the screw is to be removed from the opening and threaded into the second passage.

11. A fluid regulator as defined in claim 7, wherein the first diaphragm assembly is interchangeable with a second diaphragm assembly to enable the regulator to have a first operational characteristic different from a second operational characteristic provided by the first diaphragm assembly.

12. A fluid regulator as defined in claim 11, wherein the second operational characteristic provided by the first diaphragm assembly enables the regulator to have a full internal relief and the second diaphragm assembly enables the regulator to have a token relief.

13. A modular regulator assembly, comprising:
an actuator casing;
a valve body coupled to the actuator casing;
a first diaphragm assembly selected from a plurality of diaphragm assemblies and operatively coupled within the actuator casing, wherein the first diaphragm assembly is interchangeable with a second diaphragm assembly selected from the plurality of diaphragm assemblies, the first diaphragm assembly having a non-operative pressure relief valve assembly to prevent fluid flow between a first chamber and a second chamber of the actuator casing and across the first diaphragm assembly, and the second diaphragm assembly having an operative pressure relief valve assembly to allow fluid flow between the first and second chambers of the actuator casing and across the second diaphragm assembly;
a first stem guide removably coupled within the actuator casing, wherein the first stem guide includes a bore to slidably receive a valve stem operatively coupled to the first diaphragm assembly, and wherein the first stem guide is selected from a plurality of stem guides and is interchangeable with a second stem guide selected from the plurality of stem guides, wherein the first stem guide enables a first trim to be coupled to the fluid regulator and the second stem guide enables a second trim to be coupled to the fluid regulator, wherein the first trim is different than the second trim, the first stem guide having a passage to fluidly couple an outlet of the valve body to the first diaphragm assembly and an opening to hold a screw, wherein the screw is to be removed from the opening and coupled to the passage extending through the body to block fluid communication between the passage and the first diaphragm assembly; and a plurality of seals between an outer surface of the first stem guide and an inner surface of the actuator casing to align the first stem guide with at least one of the actuator casing or the valve body.

14. A modular regulator assembly as defined in claim 13, wherein the plurality of diaphragm assemblies comprises a plurality of interchangeable relief valve seats, relief valve stems, pusher posts, diaphragms, diaphragm plates and levers.

15. A modular regulator assembly as defined in claim 14, wherein the second diaphragm assembly from the plurality of diaphragm assemblies provides a token internal pressure relief assembly of a full internal pressure relief assembly.

16. A modular regulator assembly as defined in claim 13, wherein the each of the seals is an o-ring.

17. A modular regulator assembly as defined in claim 13, wherein the seals frictionally engage the inner surface of the actuator casing to retain the first stem guide within the actuator casing.

18. A modular regulator assembly as defined in claim 13, wherein the first stem guide is to provide a pressure balanced trim style and the second stem guide is to provide a non-pressure balanced trim style.

19. A modular regulator platform as defined in claim 13, wherein the regulator is a direct acting regulator, a pressure loaded regulator, or a pilot operated regulator.

* * * * *